(12) United States Patent
Gottschalk

(10) Patent No.: US 7,244,083 B1
(45) Date of Patent: Jul. 17, 2007

(54) CUTTING HEAD ASSEMBLY

(75) Inventor: Charles E. Gottschalk, Whitehouse, OH (US)

(73) Assignee: Glassline Corporation, Perrysburg, OH (US)

( * ) Notice: Subject to any disclaimer, the term of this patent is extended or adjusted under 35 U.S.C. 154(b) by 0 days.

(21) Appl. No.: 11/526,352

(22) Filed: Sep. 25, 2006

(51) Int. Cl.
*B23C 1/06* (2006.01)
*B23C 3/00* (2006.01)
*B23Q 5/04* (2006.01)

(52) U.S. Cl. .................. 409/232; 409/185; 409/135; 408/130; 83/543; 83/881; 65/174

(58) Field of Classification Search ........ 409/231–232, 409/185, 190, 135–136; 83/171, 169, 543, 83/881, 939–941; 408/239 R, 129, 130; 65/174, 286
See application file for complete search history.

(56) References Cited

U.S. PATENT DOCUMENTS

| | | | | |
|---|---|---|---|---|
| 3,613,974 A | * | 10/1971 | Chatelain et al. | 83/565 |
| 3,706,506 A | * | 12/1972 | Dorak | 408/130 |
| 3,838,934 A | * | 10/1974 | Petroff | 408/7 |
| 3,898,911 A | * | 8/1975 | Decaussin | 409/233 |
| 4,242,019 A | * | 12/1980 | Roch | 409/185 |
| 4,784,540 A | * | 11/1988 | Underhaug | 409/140 |
| 5,100,271 A | * | 3/1992 | Kameyama et al. | 409/231 |
| 5,381,713 A | * | 1/1995 | Smith | 83/881 |
| 5,398,579 A | | 3/1995 | Bando | |
| 5,669,636 A | * | 9/1997 | Kubala | 285/98 |
| 5,707,186 A | * | 1/1998 | Gobell et al. | 409/136 |
| 5,807,166 A | | 9/1998 | Bando | |
| 5,857,398 A | | 1/1999 | Bando | |
| 5,873,773 A | | 2/1999 | Bando | |
| 5,888,268 A | | 3/1999 | Bando | |
| 6,461,223 B1 | | 10/2002 | Bando | |
| 6,533,509 B1 | * | 3/2003 | Antoun | 409/233 |
| 6,658,974 B2 | * | 12/2003 | Momosaki | 83/169 |

\* cited by examiner

*Primary Examiner*—Erica Cadugan
(74) *Attorney, Agent, or Firm*—Emch, Schaffer, Schaub & Porcello, Co., L.P.A.

(57) ABSTRACT

A cutting head assembly for use in cutting plate glass has a simplified drive train, all positioned about the vertical rotational centerline. The drive train includes a hollow bore drive motor having a drive adaptor directly engaged with a spline shaft that extends through the hollow bore. The lower end of the spline shaft is directly engaged with a cutting tool holder for retaining a cutting tool. The drive motor imparts rotational movement to the cutting tool through the spline shaft and the cylinder imparts vertical movement to the cutting tool by vertical movement of the spline shaft.

13 Claims, 4 Drawing Sheets

CUTTING HEAD ASSEMBLY

BACKGROUND OF THE INVENTION

The present invention provides a glass plate cutting head designed to create a cut line in a glass panel, for use in the breaking of the glass panel along the cut line to form an edge having a specified dimension and shape. Such cutting heads are commonly used in connection with two axis glass shape cutting tables wherein the cutting tool is programmed, commonly through CNC controls, to create a cut line on a flat glass panel in accordance with a preprogrammed shape and design.

Currently, commercially available glass cutting heads generally fall into two categories. The first category is a non-powered floating head wherein the cutting tools mounted in bearing supports to be free floating. As the glass cutting machine is operated to move the cutting head along a pattern, the cutting tool is found to trail the direction of travel of the vertical center line of the cutting head. Since the cutting tool is free floating in its bearing support, the trailing tool will automatically follow the direction of travel and mostly stay in line with the desired cut line. This type of cutting head is commonly referred to as an eccentric cutting head since the cutting tool is not positioned directly on the rotational center line.

The floating head cutting tool is widely acceptable for use with cut designs that are predominantly straight lines with few corners and curves. Problems have been encountered however with using the non-powered floating head cutting tool when cutting curved patterns because the eccentric design of the cutting head causes the cutting tool to trail inside the desired cut line of a curve or corner thus, providing an inaccuracy of the part from the desired pattern.

Another problem commonly encountered when using a non-powered free floating cutting head is that the cutting tool is not always aligned with the direction of travel of the desired cut when starting the cutting operation, thus creating certain inaccuracies at the start of the cut resulting in inaccuracies in the cut edge of the desired shape of the work piece.

The deficiencies of the non-powered free floating cutting head have been, in part, overcome through the addition of a servo drive and CNC control to assist in positioning and controlling the cutting tool heads. However, common prior art servo controlled cutting heads, while being much more accurate in providing the desired cut line, are very expensive due to the additional required equipment such as drive motors, gear boxes, belts, pulleys, and precision bearing shafts. Many common prior art units also include a precision air cylinder designed into the combination of equipment for lifting the cutting tool off the glass and also for providing the pressure on the cutting tool when in operation. These prior art cutting heads commonly have the cutting tool mounted within a bearing support member and being spring biased to allow the cutting tool to have a small amount of freedom of movement, thus allowing the cutting tool to follow the projected cut line despite any inaccuracies or vibrations created by the gear line of gear boxes, belts, pulleys, motors, and the various interconnections. Further, the cutting tool of this type of unit is usually eccentrically positioned, thus allowing the cutting tool to trail the vertical center line of the cutting head tool and provide an accurate match to the cutting line. Again, the eccentric cutting tool encounters problems when cutting curves in that it commonly trails inside the desired cut line for the curve. Attempts to overcome this deficiency of the eccentric cutting tools have included locking the cutting tool into a fixed position and allowing no freedom of movement. However, if there is any discrepancy between the direction of movement of the cutting tool and the positioning of the cutting tool, commonly the result of minor inefficiencies and vibrations in the gear line, the cutting tool will be subject to damage as it is dragged in the cutting direction.

Another problem encountered with the prior art motor driven cutting heads lies in the positioning of the head relative to the work piece. If the cutting head is accidentally dropped on the work piece or catches on the edge of the work piece while in motion, the precision bearing shaft may quite possibly be damaged causing major down time and expense for repairs.

There is a need for a cutting head assembly of simple design which provides the desired accuracy in matching the travel of a cutting tool to the desired cutting line of a work piece.

There is a further need for a cutting head assembly that eliminates the need for an expensive gear line, including such elements as gear boxes, belts, pulleys and precision bearing shafts.

There is a further need for a cutting head assembly that eliminates the need for use of eccentrically mounted cutting tools and yet ensures accuracy and efficiency through the use of a concentrically mounted cutting mechanism.

These needs and others are met by the invention as described below with reference to the drawings.

SUMMARY OF THE INVENTION

The present invention provides for an improved cutting head assembly having minimal operating parts. A hollow bore or high torque servo motor serves as the base and support for the entire cutting assembly. The servo motor is fixed to a mounting flange which in turn is operatively moved in the X and Y cutting directions by the operative mechanisms of the glass cutting table. The use of the servo motor as the base and support for the cutting assembly eliminates the need for extra support bearings and gear boxes, thereby lowering the part count. A ball spline shaft extends through the bore of the servo motor. One end, the lower end, of the spline shaft holds the cutting tool mount and the opposed end, the upper end, of the spline shaft extends upward from the servo motor and mounting flange. A pneumatic cylinder is engaged with the opposed end of the spline shaft and is operative to lift the cutting tool away from the work piece and also to provide down-force to the cutting tool to provide the cutting force on the work piece. The pneumatic cylinder is mounted on a riser which maintains the spline shaft on centerline and allows space for the vertical movement of the cylinder and spline shaft. A rotary joint for feeding oil to the cutting head is located below the motor. Having the joint below the motor protects the motor, spline shaft, and air cylinder in case of an oil leak. The cutting tool holder, which is fixed to the low end of the spline shaft, is designed to have an undercut about its perimeter surface that provides a designated mechanical breakaway if the cutting tool holder is subjected to a severe force that might damage the spline shaft and high torque motor. The cutting tool holder is attached to the spline shaft in such a manner that it can be replaced quickly without disassembly of the cutting head assembly, thereby minimizing down production time and expense for the replacement of a broken part. The use of the direct drive and precision servo motor provide the ability to have the cutting tool be alternatively eccentric or concentric. The use of the concentric cutting tool will allow for higher precision, especially in performing corner cuts. If desired, a knife-styled cutting tool can also be attached to the spline shaft end.

Other objects and advantages of the present invention will become apparent to those skilled in the art upon a review of the following detailed description of the preferred embodiments and the accompanying drawings.

DETAILED DESCRIPTION OF THE PREFERRED EMBODIMENT(S)

Figure 1:
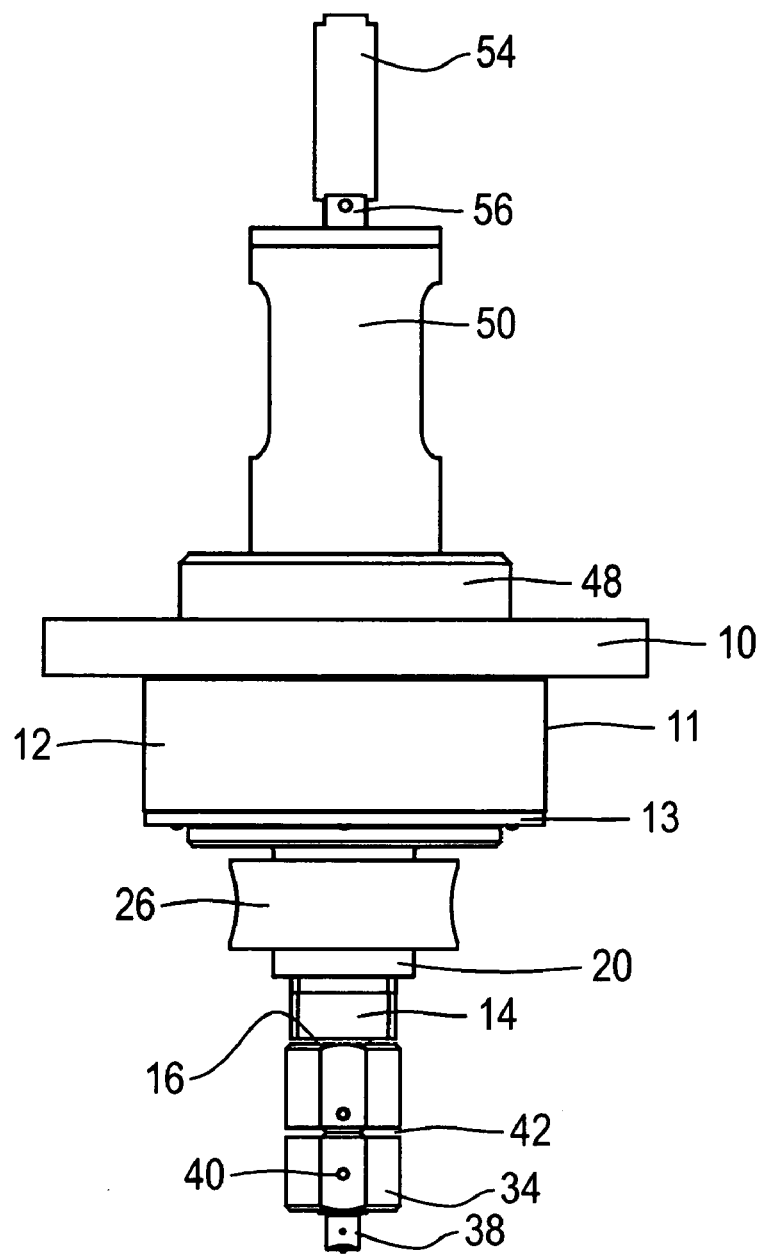
FIG. 1 is a side elevated view of the cutting head assembly of the present invention.
Figure 2:
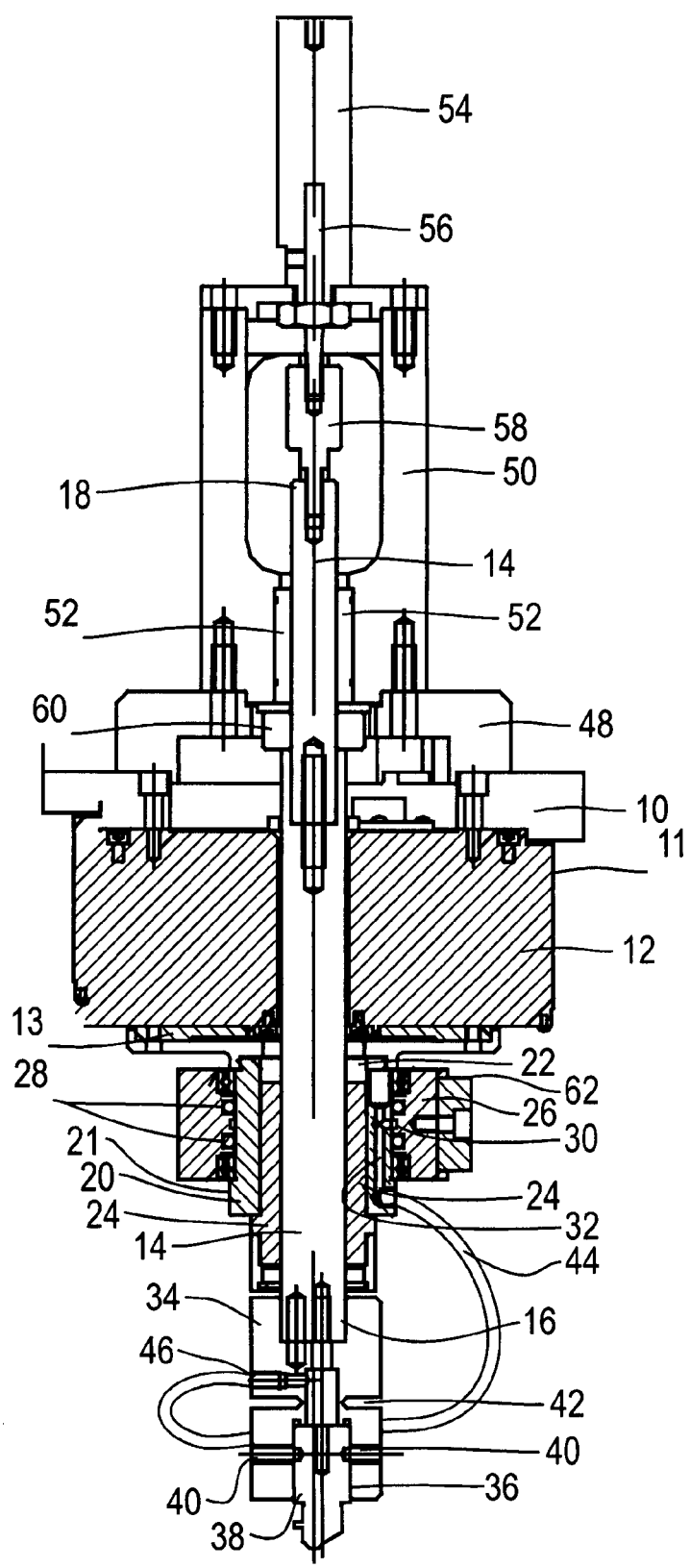
FIG. 2 is a cutaway view of the cutting head assembly of FIG. 1.
Figure 3:
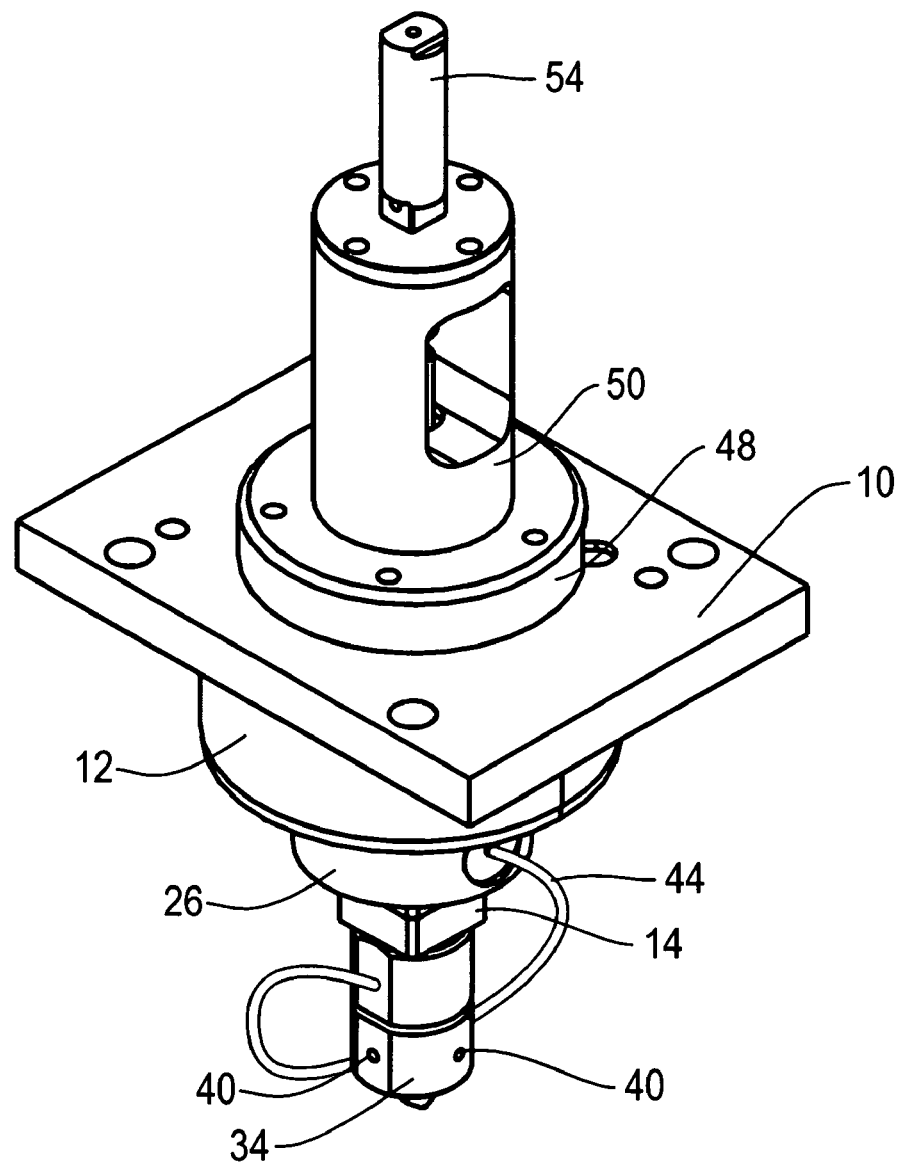
FIG. 3 is a perspective view of the cutting head assembly of FIG. 1, including the lubricating oil line.
Figure 4:
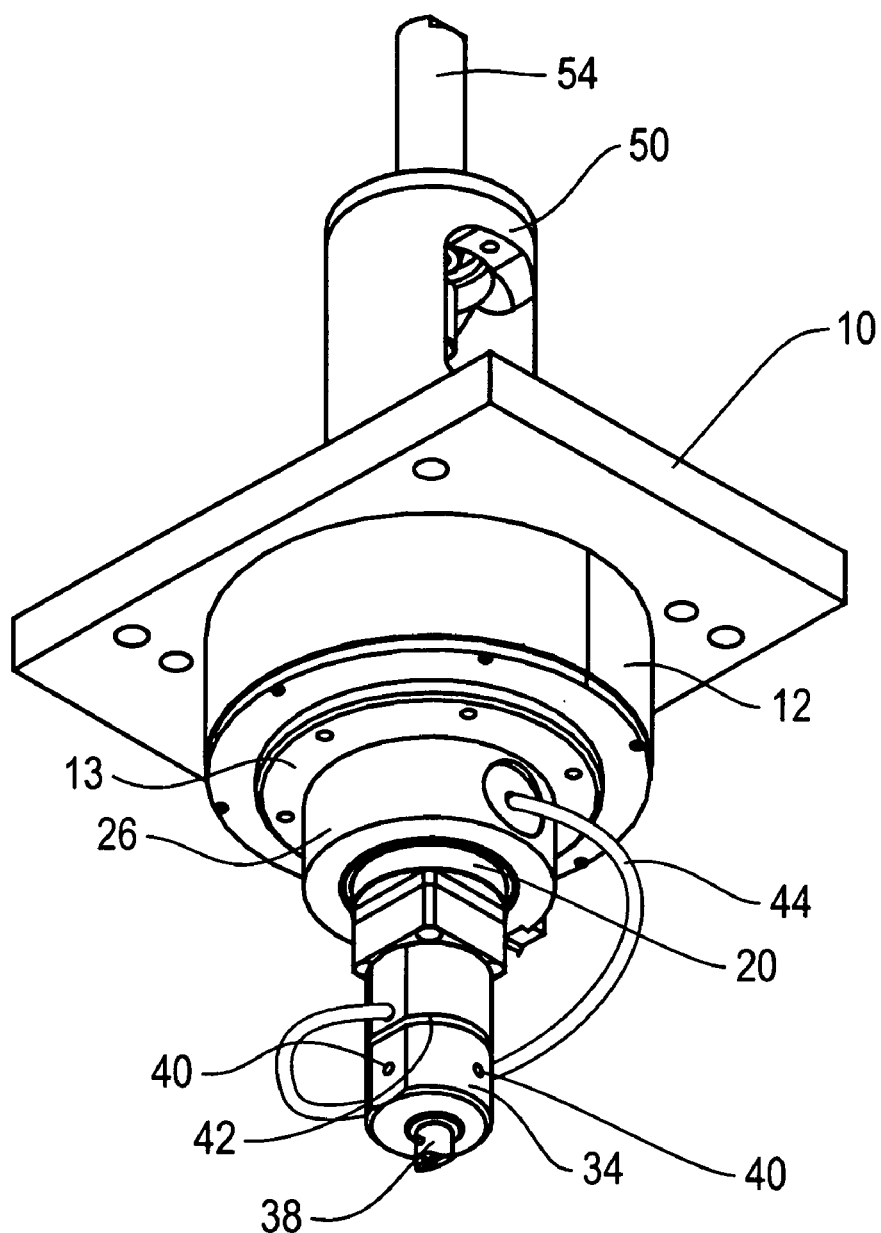
FIG. 4 is a bottom perspective view of the cutting head assembly of FIG. 1, including the lubricating oil line.

The cutting head assembly of the present invention is designed for use with an X, Y two plane cutting table. Commonly the cutting table will include a bridge riding on rails for motion in the X direction and a cutting head mount positioned on the bridge for movement in the Y direction. The cutting head mount (not shown) includes a mounting flange 10. Fixed to and directly under the mounting flange 10 is a hollow bore high torque servo motor 12. The housing 11 of the motor 12 is fixed to the flange 10. In operation, the motor 12 drives a rotating plate 13 that extends below the motor housing 11. A spline shaft 14 extends through the hollow bore of the servo motor 12 and through the flange 10. The spline shaft 14 has opposed ends 16, 18 extending below (end 16) the servo motor 12 and above (end 18) the flange 10.

A drive adaptor 20 is fixed to the rotating plate 13 of the servo motor 10. The drive adaptor 20 defines a bore 22 about its center line through which the spline shaft 14 extends. A linear ball spline 24 is positioned within the bore 22 to provide engagement between the spline shaft 14 and drive adaptor 20 to impart rotational movement to the spline shaft 14 in keeping with the rotational forces directed to the drive adaptor 20 by the servo motor 12.

Positioned about the outside surface 21 of the drive adaptor 20 is a non-moving rotary union 26 designed to supply lubricating fluid to the cutting tool. A centering block 62 is fixed to the housing 11 of the servo motor 12 and is engaged with the rotary union 26, thereby locking the rotary union 26 in a fixed position with respect to the drive adaptor 20. The drive adaptor freely rotates within the fixed rotary union 26. The rotary union 26 includes a pair of ring seals 28 that engage with the outside surface 21 of the drive adaptor 20, thus providing a seal about an oil channel 30. The oil channel 30 is in communication with an oil feed line 32 located in the drive adaptor 20.

A cutting tool holder 34 is fixed to the lower end 16 of the spline shaft 14. The cutting tool holder 34 includes a cavity 36 adapted for receiving the cutting tool 38 for the cutting head assembly unit which can be either a concentric or eccentric tool. The cutting tool 38 is commonly held in place within the cavity 36 by set screws 40. Preferably, the cutting tool holder 34 includes a shear undercut 42 which will allows the cutting tool holder 34 to break off in the instance of a severe force being applied to the cutting tool holder 34, thereby preventing any possible damage to the spline shaft 14, drive adaptor 20, and servo motor 12.

A lubricating oil feed line 44 extends from the drive adaptor 20 to a tool oil feed line 46 located in the cutting tool holder 34. When in operation, the cutting tool 38 receives a flow of lubricating oil from the tool oil feed line 46.

Fixed above the mounting flange 10 is a cutting head flange cap 48. Attached to the flange cap 48 is a cylinder riser 50 having a hollow center line. The upper end 18 of the spline shaft 14 extends into the cylinder riser 50 and is held in place along the centerline of the cylinder riser 50 by linear bushings 52. The spline shaft 14 is firmly held on the centerline when extending through the flange cap 48 by means of a clamp collar 60. Positioned on top of the cylinder riser 50 is an air cylinder 54. The plunger or piston 56 of the air cylinder 54 is engaged with the upper end 18 of the spline shaft 14 by means of an alignment coupler 58. The air cylinder 54 extends the plunger 56 vertically and retracts the plunger 56 vertically thereby providing vertical up and down movement of the cutting tool 38 by means of the spline shaft 14. The spline shaft 14 slides vertically in the linear ball spline 24 located within the drive adaptor 20 and the linear bushing 52 located within the cylinder riser 50.

Thus, the cutting head assembly of the present invention provides for extremely precise in-line movement of the cutting tool 38. The air cylinder 54 moves the cutting tool 38 vertically with no variation off of the axial center line since the spline shaft 14 is held in place by the linear ball spline 24 and linear bushing 52. Rotational movement of the cutting tool 38 is precisely provided by the servo motor 12 providing direct input to the spline shaft 14 through the drive adaptor 20 and linear ball spline 24. The structure of this cutting head assembly thereby provides accurate rotational movement of the cutting tool without any of the backlash and slop provided by known prior art cutting head assemblies.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. A cutting head assembly, for use in cutting glass plate while following a predetermined path generally created by a controller, comprising, in combination:

a drive motor having a hollow bore extending through the motor about the vertical rotational centerline of the motor; a spline shaft positioned in the bore, said spline shaft having a first end extended above the motor and a second end extended below the motor; a cutting tool removably attached to the second end of the spline shaft; and a cylinder and piston arrangement attached to the first end of the spline shaft, wherein the drive motor imparts rotational movement to the cutting tool through the spline shaft and the cylinder and piston arrangement provides movement in the vertical direction to the cutting tool through the spline shaft which moves vertically through the hollow bore of the drive motor.

2. The cutting head assembly of claim 1, wherein the drive motor includes a housing designed to be fixed in place on a mounting flange of a glass cutting table.

3. The cutting head assembly of claim 2 wherein the drive motor includes a rotational plate extending beyond and below the housing outer surface.

4. The cutting head assembly of claim 3 further including a drive adaptor, having a bore extending therethrough, attached to the rotational plate, and a linear ball spline positioned in the bore of the drive adaptor, wherein the spline shaft extends through the bore of the drive adaptor and is engaged with the drive adaptor by the linear ball spline such that rotational movement imparted by the rotating plate to the drive adaptor is imparted to the spline shaft and the spline shaft remains free to move vertically in the bores of the drive motor and the drive adaptor.

5. The cutting head assembly of claim 4 wherein the drive adaptor has a smooth outer circumference and further includes a rotary union member defining a smooth inner circumference whereby the smooth inner circumference mates with the smooth outer circumference defining a close tolerance therebetween and the rotary union member being fixed in place and the drive adaptor rotates within the rotary union member, the rotary union member defining an oil channel along its smooth inner circumference and at least two ring seals, each ring seal positioned on opposing sides of the oil channel, and wherein the drive adaptor includes an oil feed line in communication with the oil channel of the rotary union.

6. The cutting head assembly of claim 5 further including a cutting tool holder defining a centerline oriented cavity at one end and having an opposing end fixed to the second end of the spline shaft, wherein the cutting tool is removably retained within the cavity of the cutting tool holder.

7. The cutting head assembly of claim 6 wherein the cutting tool is removably retained within the cavity of the cutting tool holder by at least one set screw.

8. The cutting head assembly of claim 6 wherein the cutting tool is removably retained within the cavity of the cutting tool holder by a plurality of set screws.

9. The cutting head assembly of claim 6 wherein the cutting tool holder has an outer surface and a shear undercut is defined within the outer surface.

10. The cutting head assembly of claim 6 wherein the cutting tool holder includes an oil feed line for supplying lubricating oil to the cutting tool, the oil feed line being in communication with the oil feed line of the drive adaptor by means of a flexible lubricating oil feed line extending therebetween.

11. The cutting head assembly of claim 6 further including a cylinder riser oriented to the centerline and engaged to the housing of the drive motor for receiving the first end of the spline shaft and maintaining the orientation of the spline shaft with the vertical rotational centerline and wherein the cylinder of the cylinder and piston arrangement is fixed on the cylinder riser to engage the first end of the spline shaft.

12. The cutting head assembly of claim 11 wherein the spline shaft is retained in place within the cylinder riser by means of linear bushings.

13. The cutting head assembly of claim 11 wherein the cylinder and piston arrangement includes a piston and further including an alignment coupler, wherein the piston is engaged with the first end of the spline shaft by means of the alignment coupler.

\* \* \* \* \*